UNITED STATES PATENT OFFICE.

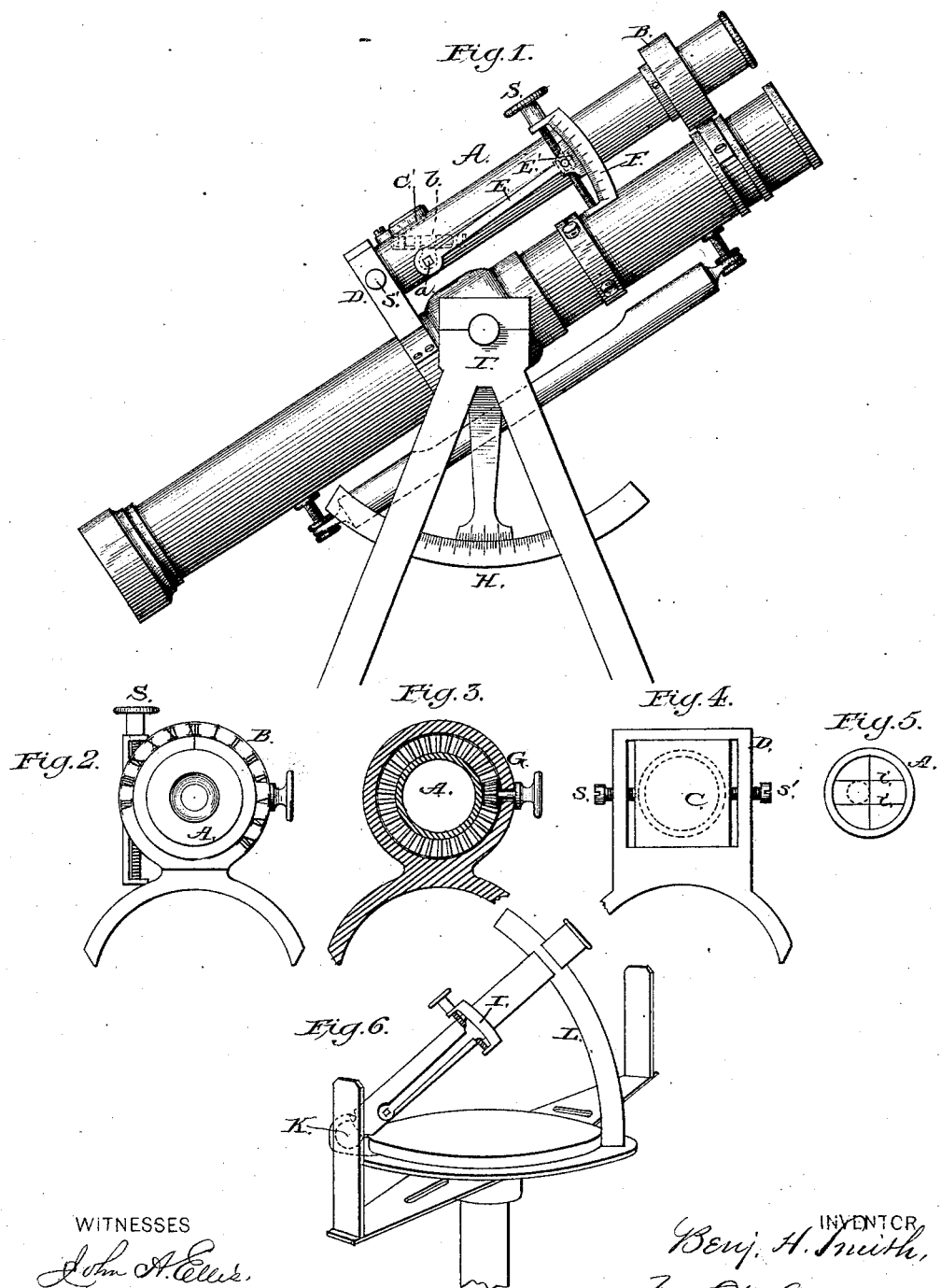

BENJAMIN H. SMITH, OF PHILADELPHIA, PENNSYLVANIA.

MERIDIAN ATTACHMENT TO TRANSIT-INSTRUMENTS.

SPECIFICATION forming part of Letters Patent No. 232,309, dated September 14, 1880.

Application filed June 24, 1880. (Model.)

*To all whom it may concern:*

Be it known that I, BENJAMIN H. SMITH, of Philadelphia, in the county of Philadelphia and State of Pennsylvania, have invented a new and valuable Improvement in Solar Attachments for Determining the True Meridian; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my improved solar attachment, and Figs. 2, 3, 4, 5, and 6 are details.

This invention has relation to improvements in means for determining the true meridian; and it consists of a revolving telescope applied to a transit-instrument and having at its object end a reflector arranged in such a manner that when the line of collimation is parallel to the polar axis of the earth and the aperture is turned toward the sun the sun's image will appear to traverse the center of the field of view, and thus determine the true meridian, as will be hereinafter more fully set forth.

In the accompanying drawings, the letter T designates an engineer's transit, and A is a telescope, revolving in a collar, B, on said instrument, and in a bearing-block, C, arranged in a frame, D, attached to the transit, and adjustable, so as to bring the axes of the telescope A and that of the transit-instrument in the same vertical plane. The block C to this end slides laterally in the frame D, and is adjusted by means of the set-screws $s\ s'$, extending through the said frame and bearing against the said block. The telescope A is controlled and operated by means of a rack-and-pinion movement in the collar B, Fig. 1, and fully shown at G, Fig. 3.

F is the declination-arc, the vernier being attached to the arm E, which is secured to a shaft, $a$, having its bearings in the sides of the telescope, and having secured to it the reflector $b$, arranged inside of the tube. This reflector is at an angle of forty-five degrees to the line of collimation when the vernier is at the zero-point, and it is adjusted by means of a screw, S, having its bearings in the ends of arc F, and engaging a screw-threaded offset on the arm E. This arm is provided with the vernier E', that works in connection with the declination-arc F.

Opposite the reflector is an aperture, C', in the side of the tube A, covered by adjustable dark glasses for regulating the intensity of the light.

The collar B, in which the telescope A revolves, is shown in Fig. 2 graduated for an hour-circle, and the vertical circle H of the transit-instrument is utilized as a latitude-arc.

To determine true meridian with this instrument the telescope is inclined until the line of collimation makes an angle with the horizon equal to the latitude of the place where the observation is taken. The declination of the sun is then set off on the declination-arc F, and the instrument turned horizontally and the telescope revolved until the image of the sun is seen to traverse the parallel wires $i$. The telescope is then in the plane of the true meridian, and the hour of the day may be read off from the hour-circle on the collar B.

For turning right angles, the telescope of the transit is made level and the declination-vernier set at zero. On revolving the telescope all objects seen in the center of the field of view will be at right angles with the axis of the telescope.

This device is shown in Fig. 6 attached to an open-sight compass, wherein the letter L indicates the latitude-arc, and I the declination-arc, arranged on the bearing-collar, in which the telescope revolves. A universal or ball-and-socket movement at K permits the telescope to be turned in any required direction.

I am aware that a meridian-finder composed of an exterior reflector mounted upon an axis at right angles to the line of collimation of a transit-telescope, and having a movement about a center coincident with the said line, combined with a transit or similar surveying-instrument, is not new, and I do not claim such devices.

What I claim as new, and desire to secure by Letters Patent, is—

1. A revolving telescope having an adjustable reflector, $b$, inside of its barrel, near its object end, and an aperture in the side of said barrel opposite the reflector, and provided with adjustable dark glasses, the said telescope being so arranged relative to the telescope of a transit-instrument that when the line of collimation is parallel to the polar axis of the earth and the aperture in the barrel of the telescope is turned toward the sun the image of the latter will traverse the field of view, substantially as specified.

2. The combination, with a transit-telescope and a supplementary telescope, A, mounted thereon and having axial rotation, of a declination-arc, F, a reflector, $b$, the shaft $a$, the arm E′, carrying the vernier, the adjusting-screw S, and the hour-circle collar B, substantially as specified.

3. The combination, with a transit-instrument, of a revolving telescope mounted thereon, an adjustable reflector at the object end of the said telescope, arranged opposite a shaded aperture therein, a declination-arc on the telescope, an arm, E′, carrying the vernier, and operated by a set-screw to adjust the reflector and move the vernier over the declination-arc, and an hour-circle bearing, B, all combined and arranged to operate substantially as specified.

In testimony that I claim the above I have hereunto subscribed my name in the presence of two witnesses.

BENJAMIN H. SMITH.

Witnesses:
ALLEN H. GANGEWER,
CHAS. F. VAN HORN.